(12) United States Patent
Dakroub

(10) Patent No.: US 6,710,956 B1
(45) Date of Patent: Mar. 23, 2004

(54) PREAMP USING PULSED WRITE CURRENTS

(76) Inventor: Housan Dakroub, 7424 NW. 101st, Oklahoma City, OK (US) 73162

( * ) Notice: Subject to any disclaimer, the term of this patent is extended or adjusted under 35 U.S.C. 154(b) by 0 days.

(21) Appl. No.: 09/533,435

(22) Filed: Mar. 23, 2000

Related U.S. Application Data

(60) Provisional application No. 60/141,625, filed on Jun. 30, 1999.

(51) Int. Cl.$^7$ ................................................ G11B 5/09
(52) U.S. Cl. .......................................... 360/46; 360/68
(58) Field of Search ............................ 360/68, 41, 65, 360/75, 66, 77.05, 46

(56) References Cited

U.S. PATENT DOCUMENTS

| | | | |
|---|---|---|---|
| 4,639,794 A | | 1/1987 | Ferrier ......................... 360/46 |
| 4,787,002 A | | 11/1988 | Isozaki ........................ 360/118 |
| 4,837,644 A | * | 6/1989 | Yunoki ......................... 360/66 |
| 4,965,873 A | * | 10/1990 | White .......................... 360/41 |
| 5,095,396 A | | 3/1992 | Putnam et al. .............. 360/106 |
| 5,107,378 A | | 4/1992 | Cronch et al. ................ 360/45 |
| 5,132,852 A | * | 7/1992 | Price, Jr. ..................... 360/46 |
| 5,262,907 A | * | 11/1993 | Duffy et al. ............. 360/77.05 |
| 5,357,379 A | | 10/1994 | Gower ......................... 360/46 |
| 5,726,821 A | | 3/1998 | Cloke et al. .................. 360/67 |
| 5,790,331 A | | 8/1998 | Aranovsky ................... 360/46 |
| 5,822,141 A | | 10/1998 | Chung et al. ................. 360/46 |
| 5,867,334 A | * | 2/1999 | Soichi et al. ................. 360/68 |
| 5,946,157 A | | 8/1999 | Codilian et al. .............. 360/75 |
| 6,175,319 B1 | * | 1/2001 | Schneider et al. ............ 360/65 |
| 6,215,607 B1 | * | 4/2001 | Ngo ............................. 360/46 |
| 6,282,051 B1 | * | 8/2001 | Albrecht et al. .............. 360/75 |
| 6,452,736 B1 | * | 9/2002 | Saiki et al. ................... 360/46 |

* cited by examiner

*Primary Examiner*—David Hudspeth
*Assistant Examiner*—Rocio Colon
(74) *Attorney, Agent, or Firm*—Kirk A. Cesari

(57) ABSTRACT

A disc drive includes a base and a disc rotatably attached to the base. The disc drive also includes an actuator assembly rotatably attached to the base and a device for moving the actuator assembly. The actuator assembly includes an arm carrying a write head in a transducing relationship with respect to the disc. The write head further includes a preamp current driver circuit. A data pulse circuit is operatively coupled to the preamp current driver circuit to provide a write current impulse based on an input data pattern. The preamp current driver circuit further includes a plurality transistors to receive the write current impulse and provide a sequence of write current impulses of opposite polarity to the write head for effecting magnetic recording on the disc of the disc drive based on the input data pattern.

14 Claims, 8 Drawing Sheets

PREAMP USING PULSED WRITE CURRENTS

RELATED APPLICATION

This application claims the benefit of U.S. Provisional Application Serial No. 60/141,625, filed Jun. 30, 1999 under 35 U.S.C. 119(e).

FIELD OF THE INVENTION

The present invention relates to the field of mass storage devices. More particularly, this invention relates to an improved preamp for magnetic recording in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and a write head in the transducer head, and a preamp for providing a write current impulse to drive the write head to write and read data to and from the disc. The disc drive also includes circuitry for encoding data so that it can be successfully, retrieved and written to the disc surface. A microprocessor controls most of the operations of the disc drive as well as passing the data back to the requesting computer and taking data from a requesting computer for storing to the disc.

The transducer head is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the disc. Disc drive systems read and write information stored on tracks on the discs. Transducers, in the form of read/write heads attached to the sliders, located on both sides of the disc, read and write information on the storage discs when the transducers are accurately positioned over one of the designated tracks on a surface of the disc. The transducer is also said to be moved to a target track. As the storage disc spins and the read/write head is accurately positioned above a target track, the read/write head can store data onto a track by writing information representative of data onto the disc. Similarly, reading data on the disc is accomplished by positioning the read/write head above a target track and reading the stored material on the disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of the disc drive. Servo feedback information is used to accurately locate the transducer head. The actuator assembly is moved to the required position and held very accurately during a read or write operation using the servo information.

The actuator/arm is rotatably attached to a shaft via a bearing cartridge which generally includes one or more sets of ball bearings. The shaft/post is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Magnetic recording on a disc of a disc drive is a well developed and important technology. Of particular interest is digital, or more precisely binary storage in which the disc is magnetized in one direction for one state and in another direction for another state. A write head attached to the transducer of the disc drive impresses a magnetization on the disc in either one direction or another, dependent on the data signal. The signal thus recorded on the media is subsequently read by a read head using techniques well known in the art.

Generally thin-film heads are used for magnetic recording on the disc because of their small size and their light-weightedness. The problem with thin-film heads is that they are so light-weighted that the head cannot adequately dissipate heat. The current methods of magnetic recording drives the write head continuously during the entire bit or cell period, with the polarity of the drive current determined by the data. That is the duty cycle is nearly 100%. This generally requires auxiliary cooling devices to increase the heat dissipation. This however increases the head weight and further complicates its otherwise light-weight simple structure. Also the continuous write current technique makes it increasingly difficult to write data using a continuous current at higher transfer rates such as greater than one gigabit (Gb) per second ($1 \times 10^9$ bits/sec), due to various factors including stray inductance and capacitance along the conductive paths between the heads and the preamp, the slew rates in the positive and negative transitions, and the power dissipated by the preamp.

What is needed is a write head including a preamp that is smaller, writes faster, requires lower power and minimizes head heating.

SUMMARY OF THE INVENTION

An information handling system, such as a disc drive, includes a base, a disc rotatably attached to the base, and an actuator assembly movably attached to the base. Attached to one end of the actuator assembly is a write head having a predetermined head gap. The write head is in transducing relationship with the disc. The write head operatively coupled to a preamp current driver circuit for providing a write current impulse to drive the write head, and a data pulse circuit for supplying digital data signal in the form of data pulses based on an input data pattern. The preamp current driver circuit is operatively coupled to the data pulse circuit. The preamp current driver circuit further includes a pair of voltage driven switches to provide a write current impulse of opposite polarity based on the input data pattern. The preamp current driver circuit further includes a pair of current driven switches to receive the write current impulse from the pair of voltage driven switches, and provide a sequence of write current impulses of opposite polarity to the write head for effecting magnetic recording on the disc of the disc drive based on the input data pattern. The voltage driven switches further change the polarity of the write current impulse anytime near an end of the sequence of write current impulses. This technique does not involve driving the write head continuously during an entire bit or cell time. This technique enables the recording to be done with write current impulses which are generated at edges of the bit or cell time. This is generally possible because the field generated from the write head is generally large enough to magnetize or stamp media beyond a write head gap.

In this embodiment, the preamp current driver circuit generates a leading edge and trailing edge write current transition impulses corresponding to an input data pattern. In general a disc is moving past the write head, and this disc movement tends to extend the amount of the disc being magnetized during a time the write head field existing with sufficient strength to saturate the disc. In this embodiment the leading and trailing edge current transition impulses are of sufficient positive and negative polarity to saturate the disc. In an another embodiment, the preamp current driver circuit generates a sequence of same polarity write current impulses (same as the leading edge transition impulse) having a predetermined repetition period based on the predetermined head gap of the write head, and a velocity of the disc rotating past the write head when a time for the length of recording between the leading and the trailing edge transition impulses are greater than a time for effective recording by the write head gap. The sequence of write current impulses generated by the preamp current driver circuit are sufficient to maintain a substantially equalized recorded continuum between the transition impulses when the time for the length of recording between the leading and the trailing edge transition impulses are greater than a time for effective recording by the write head gap. In one embodiment the leading edge write current transition impulse occurs at the beginning of an input data pattern, and the trailing edge write current transition impulse occurs at the end of the input data pattern. In another embodiment the leading and trailing edge write current transition impulses are of positive and negative polarity and are of sufficient amplitude to saturate the disc respectively.

Advantageously, the improved preamp set forth above, allows the preamp to input lower power, and higher peak currents into the write head. Further the improved preamp eliminates the need for write current overshoot adjustments, and provides faster write current rise times, since the impulses eliminate the need for maintaining steady current to the write head. Further the write current impulses having a higher peak currents enables writing higher coercivity media faster than the current techniques. This improved preamp generating write current impulses results in less heat being generated at the write head, thereby avoiding the overheating problem existing in the current designs. Also this improved method of recording permits faster field raise times, and further simplifies the preamp current drive circuit design. Also the faster raise times improves a transition zone on the disc which can result in improved signal to noise ratio performance.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
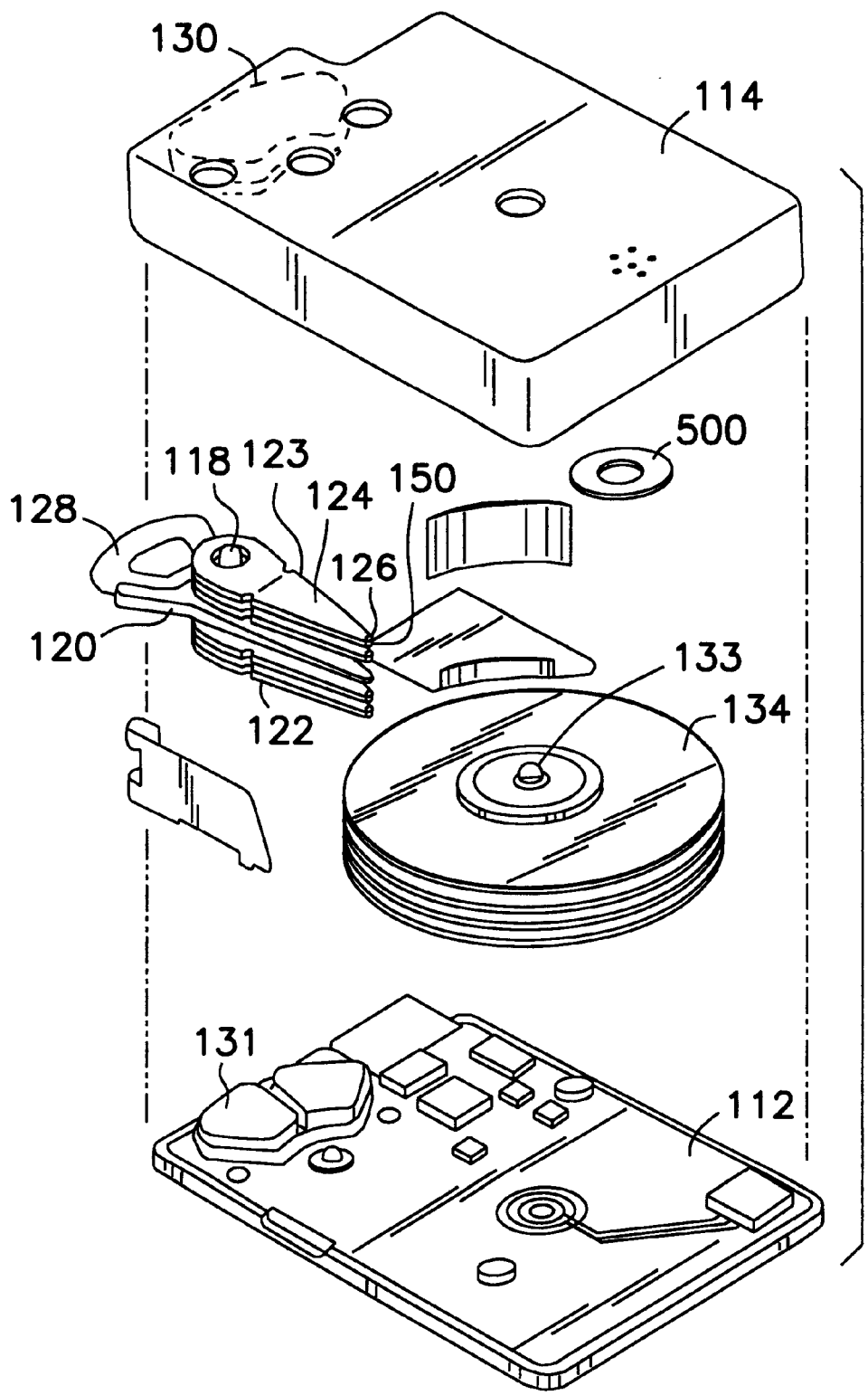
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the first magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
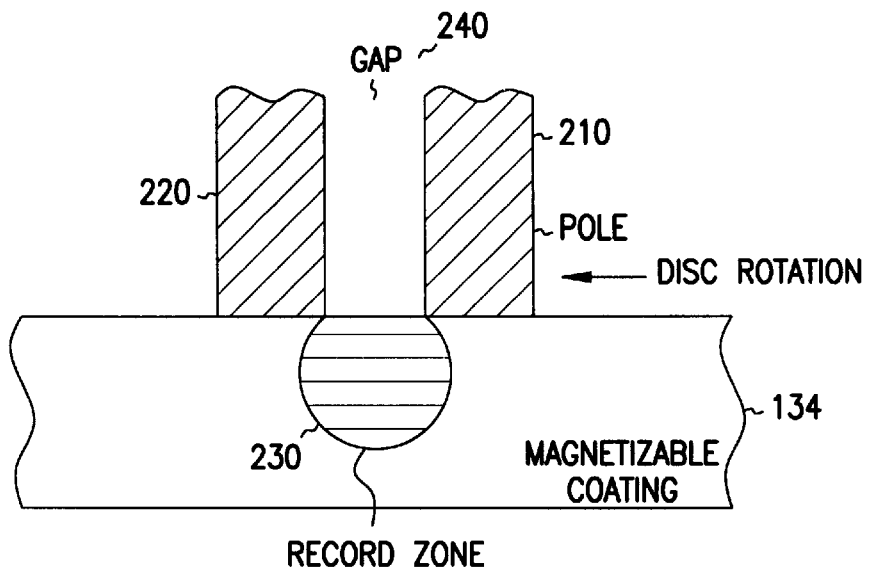
FIG. 2 is across-sectional view of a magnetic region recorded by a write head on to a disc.

FIG. 2 is a cross-sectional view of a magnetic region recorded by a write head comprising two magnetic poles 210 and 220 separated by a write head gap 240. A recording medium such as a disc 134 is covered with a magnetizable coating that rotates past the magnetic poles 210 and 220. Generally the disc 134 is spaced as close as practical to the magnetic poles 210 and 220. The magnetic poles 210 and 220 can impress magnetization onto the disc 134 in one of two polarities, depending upon the direction of current being delivered to the write head between the magnetic poles 210 and 220. At a particular time, the disc 134 and magnetic poles 210 and 220 can be considered stationary, the magnetic poles 210 and 220 will impress a bubble-shaped region 230 (also referred to as a magnetic bubble) of saturization magnetization on the disc 134. The bubble 230 lies roughly below the gap and between the magnetic poles 210 and 220, and can be as wide as 2 to 4 times the gap.

Figure 3:
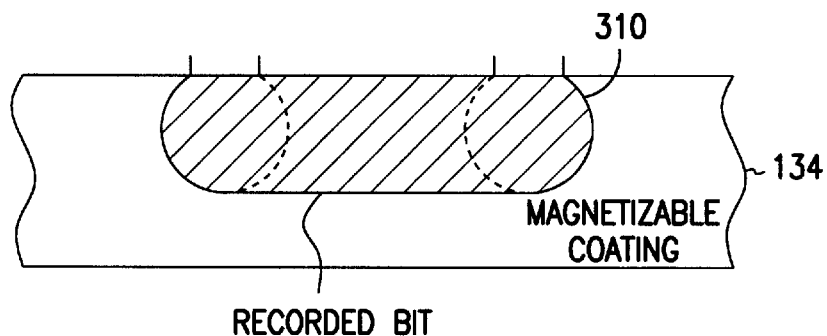
FIG. 3 is a cross-section view of a recorded bit by a write head on to a disc as practiced in the prior art.

The current techniques of writing to the disc requires the write head to be driven for the entire time of a bit or cell period as the disc 134 moves beneath the magnetic poles 210 and 220 so that the bubbles are merged into a continuous region 310 of magnetization illustrated in FIG. 3. This type of magnetic recording by the write head results in overheating, particularly for thin-film heads. The conventional technique requires fast transitions in output current over a substantial range of opposing maximum current values. With continued increases in data transfer, it becomes increasingly difficult to consistently and accurately carry out these fast changes in current direction. The power dissipated by the write head at such high transfer rates is also substantial, which in turn limits the maximum current magnitudes that can be applied and can, over time, reduce the operation and reliability of the disc drive. Moreover, as transfer rates increase, factors such as stray inductance and capacitance that reach the write element, can result in degraded write performance from overshoot, ringing and signal decay.

Figure 4:
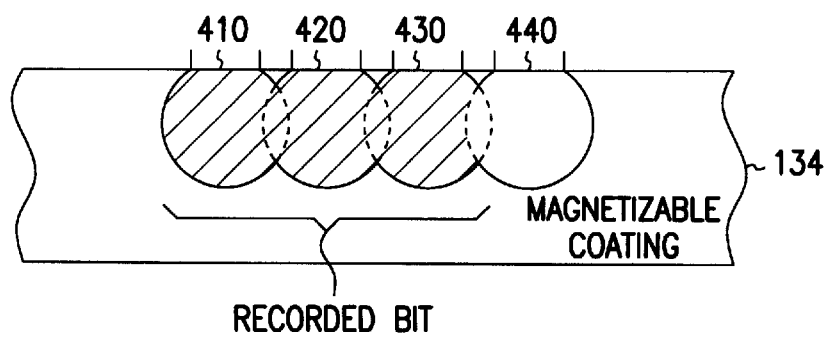
FIG. 4 is a cross-sectional view of a recorded bit by a write head on to a disc according to the present invention.

According to the present subject matter, the write head is repetitively pulsed during the recording of a single bit so that while the magnetized region is not uniform, it is nonetheless nearly continuous. As illustrated by way of example in FIG. 4, three write current impulses are used for each recorded bit. The three write current impulses create three corresponding bubbles 410, 420, and 430, which because of their lateral extent intersect and form a nearly continuous region of magnetization. This eliminates the need for continuously maintaining the current during the entire bit or cell period. The next bubble 440 to be recorded belongs to the next recorded bit and its polarity may differ from the previous bubble 430, depending upon the data to be recorded. The illustration in FIG. 4 does not depict the effect of the finite pulse width of the recording pulse which produce the bubbles 410, 420, 430, and 440. A realistic illustration would extend the lateral extent of the bubbles 410, 420, 430, and 440 due to the continuous movement of the disc 134 past the write head comprising the magnetic poles 210 and 220.

Figure 5:
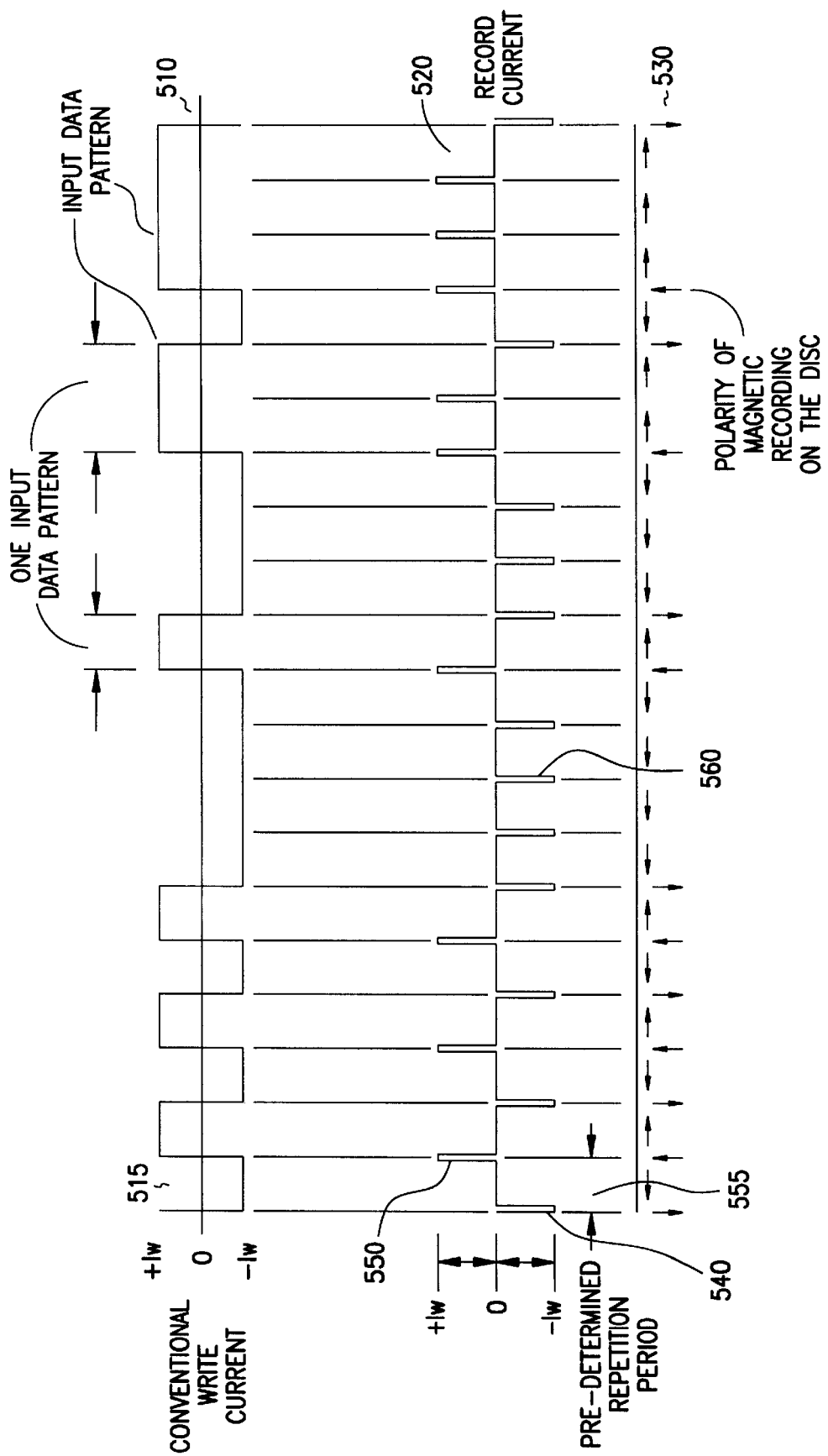
FIG. 5 is a timing diagram illustrating the relationship between input data patterns and recording of the write current impulses in the current technique.

FIG. 5 is a timing diagram illustrating the relationship between the input data pattern 510, recording of corresponding write current impulses 520, and a vector magnetization model of a recording produced by the write current impulses 530 used in the current technique. FIG. 5 illustrates the present technique of recording with a leading edge write current transition impulse 540, and the trailing edge write current transition impulse 550 correspond to an input data pattern 515. FIG. 5. Also illustrates a recording of a sequence of write current impulses having a predetermined repetition period 555, when a time for length of recording between the leading and trailing edge write current transition impulses 530 and 540 is greater than a time for a length of effective recording by a write head to maintain a continuous region of magnetization corresponding to a bit cell (input data pattern). Although the conventional technique is faster than the continuous recording technique, it is still not fast enough to transfer data at faster rates to a disc.

Figure 6:
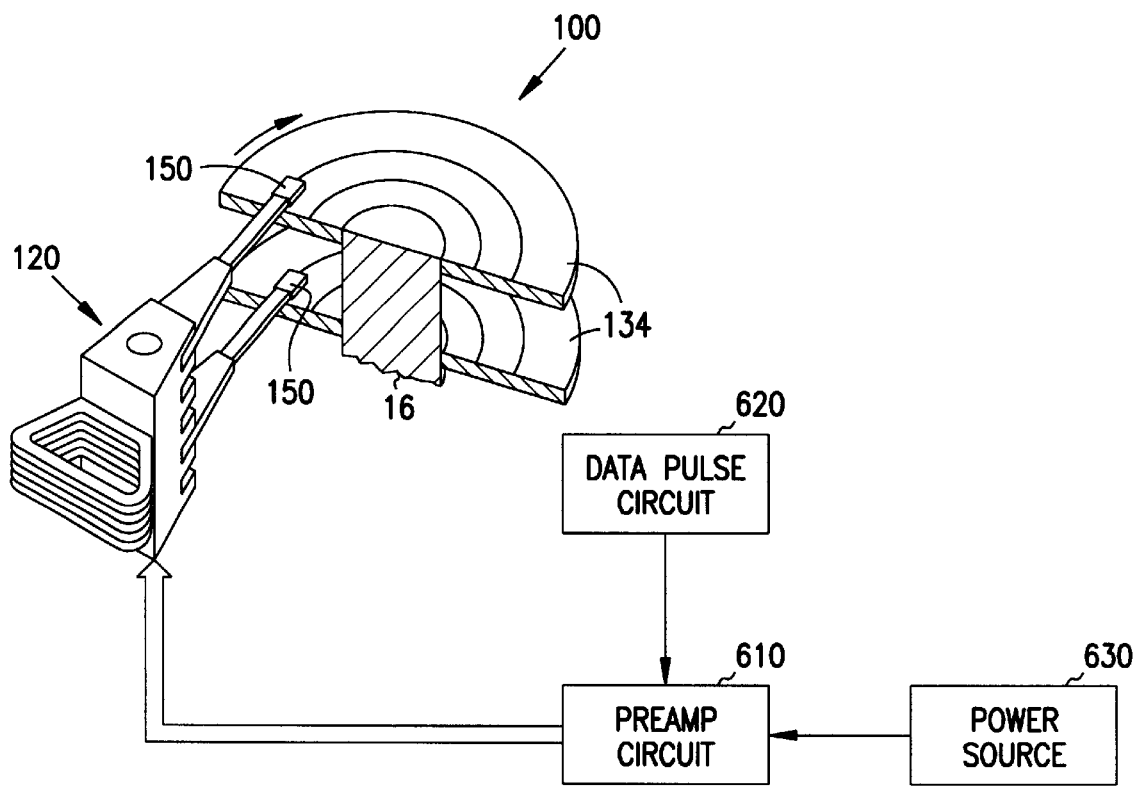
FIG. 6 is a schematic representation of a hard disc including portions of the improved preamp and its associated circuitry for controlling the flow of current to the write head according to the present invention.

FIG. 6 is a schematic representation of a disc drive 100 including portions of the improved preamp and its associated circuitry for controlling the flow of write current impulses to the write head corresponding to a data pattern such that the recording on the disc by the write current impulses form a nearly continuous magnetic region on the disc 134. FIG. 6 also shows the preamp circuitry operatively coupled to a data pulse circuit 620 and a power source 630. Also shown in FIG. 6 is an actuator assembly 120 of a disc drive 100 having write heads 150 operatively coupled to the preamp circuit 610. The preamp circuitry 610 provides a sequence of write current impulses of positive and negative polarity to the write head 150 for effecting magnetic recording on the disc 134, corresponding to an input data pattern from the data pulse circuit 620. In one embodiment the data pulse circuit 620 is incorporated into the preamp circuitry 610.

Figure 7:
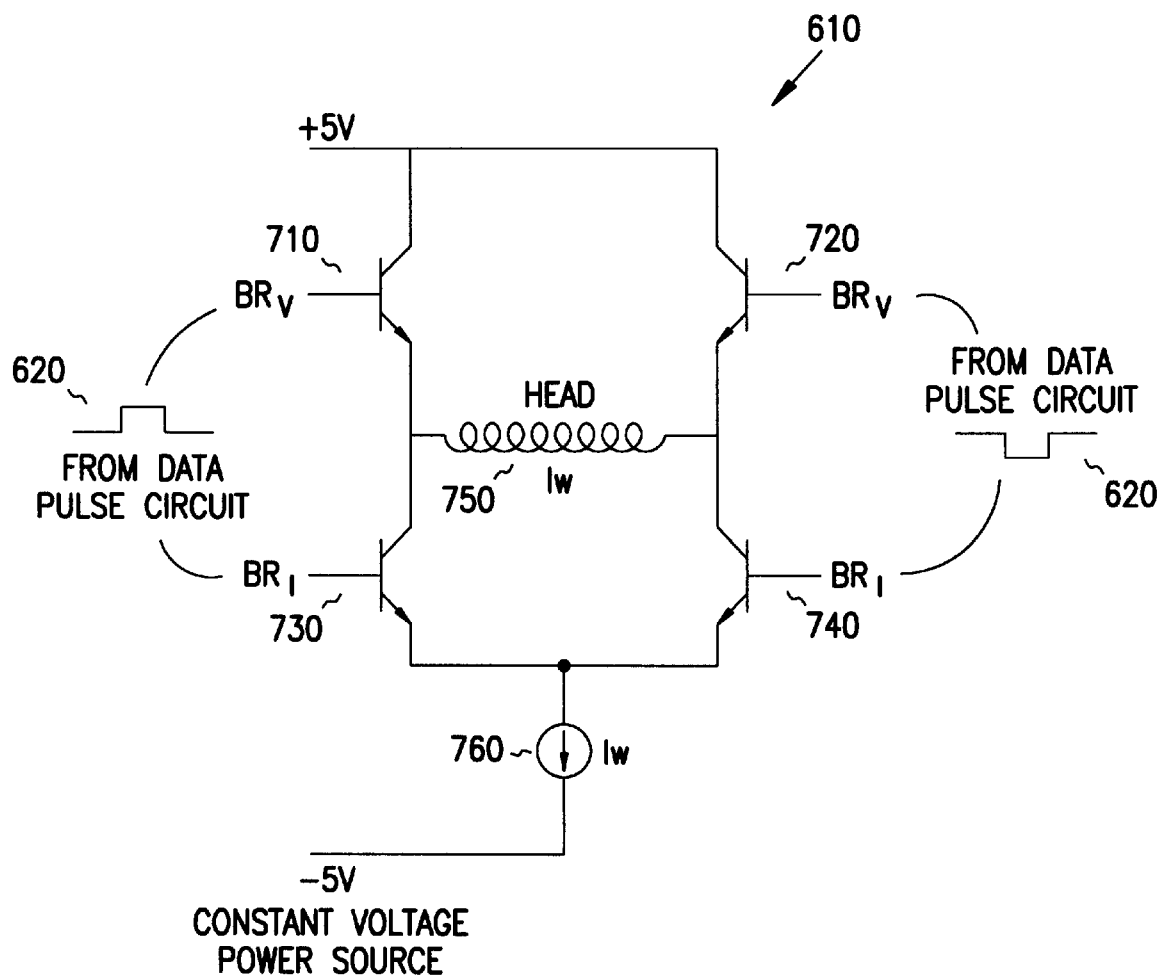
FIG. 7 is a schematic diagram illustrating one embodiment of the preamp and its associated circuitry.

FIG. 7 illustrates a schematic diagram of one embodiment of the preamp circuitry 610 and its associated circuitry used in the present subject matter, which steers current through a coil 750 in the write head 150 comprising magnetic poles 210 and 220. The voltage and direction of current across the coil 750 are controlled by the preamp circuitry 610. In one embodiment the preamp circuitry includes a pair of PNP 710 and 720, and NPN transistors 730 and 740, respectively. The transistors 710, 720, 730, and 740 are operatively coupled to the data pulse circuit 620 to receive input data patterns. The transistors 710, 720, 730, and 740 are connected to a current source 760. The operation of the preamp 610 is to determine in which direction through the coil 750 this current 760 is steered. This invention can be advantageously used for multiple write heads 150 in a single assembly by duplicating the preamp 610 for each coil 750. In one embodiment the preamp circuitry 610 drives the write head 150 by providing write current impulses corresponding to an input data pattern from the data pulse circuit 620, and by using the transistors 710, 720, 730, and 740 to provide a sequence of write current impulses of positive and negative polarity to the write head of the disc drive 100 for effecting magnetic recording on the disc 134 based on the input data pattern.

Figure 8A:
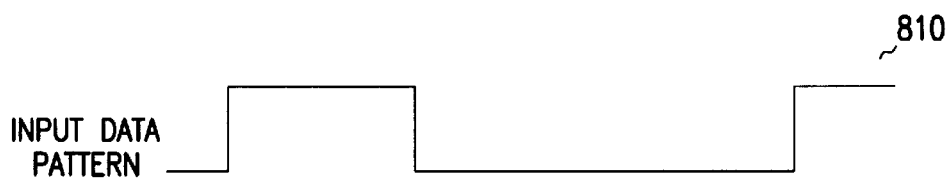
FIG. 8A is a timing diagram illustrating the input data pattern.
Figure 8B:
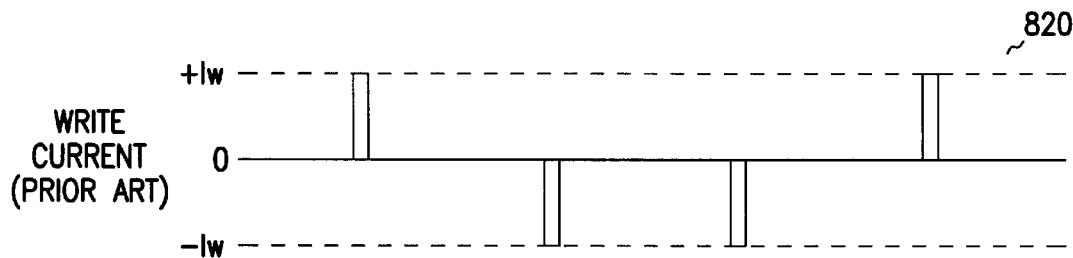
FIG. 8B is a timing, diagram illustrating method of generating the sequence of write current impulses according to the prior art.
Figure 8C:
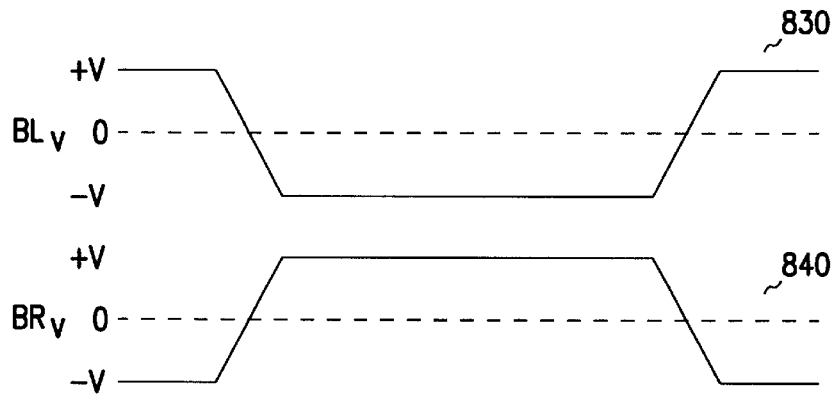
FIG. 8C is a timing diagram illustrating method of interrupting the input data pattern by the pair of voltage driven switches according to the present invention.
Figure 8D:
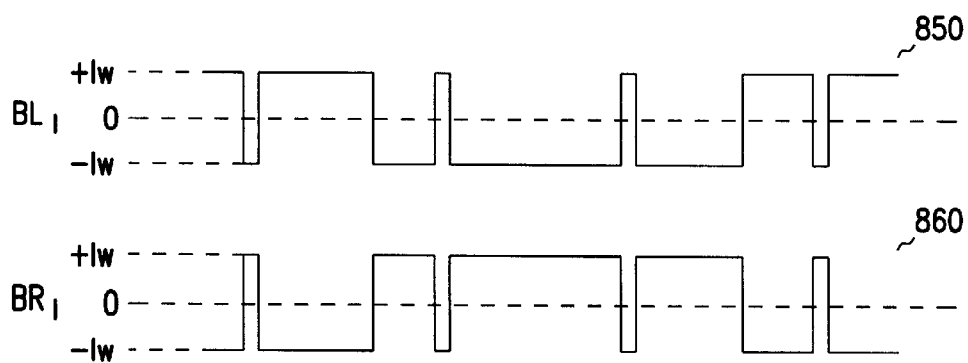
FIG. 8D is a timing diagram illustrating method of generating the sequence of write current impulses according to the present invention.

FIGS. 8A, 8B, 8C, and 8D are timing diagrams illustrating the relationship between input data pattern 810, sequence of write current impulses generated by the prior art preamp 820, and sequence of write current impulses generated by the preamp of the present invention 830, 840, 850, and 860. In one embodiment the input data pattern 810 is received and interrupted by a pair of voltage driven switches of the preamp circuitry 610 to provide a write current impulse of positive and negative polarity based on the input data pattern 810, and further interrupting a pair of current driven switches of the preamp circuitry 610 to provide a sequence of write current impulses of positive and negative polarity to the write head 150 of the disc drive 100 for effecting a magnetic recording on the disc based on the input data pattern, further interrupted by the voltage driven switches of the preamp circuitry 610 to change polarity of the write current impulses for a next input data pattern. This technique enables drive currents and voltages to the write head to be shaped to complement head field rise times, interconnect effects, head electrical transfer functions and driver limitations. In FIGS. 8C and 8D, the timing diagrams 830, 840, 850, and 960 clearly demonstrate that the pair of voltage driven switches need not be switched as quickly as the pair of current driven switches to accommodate a change in an input data pattern. The pair of voltage driven switches need only be switched near the end of a delivery of a sequence write current impulses to a write head 150. The prior art technique described in FIG. 5 required all of the transistors to be switched according to the changes in the input data pattern. This enables the preamp circuitry 610 of the present subject matter to run faster and transfer more data at a faster rate than the current technique.

Figure 9:
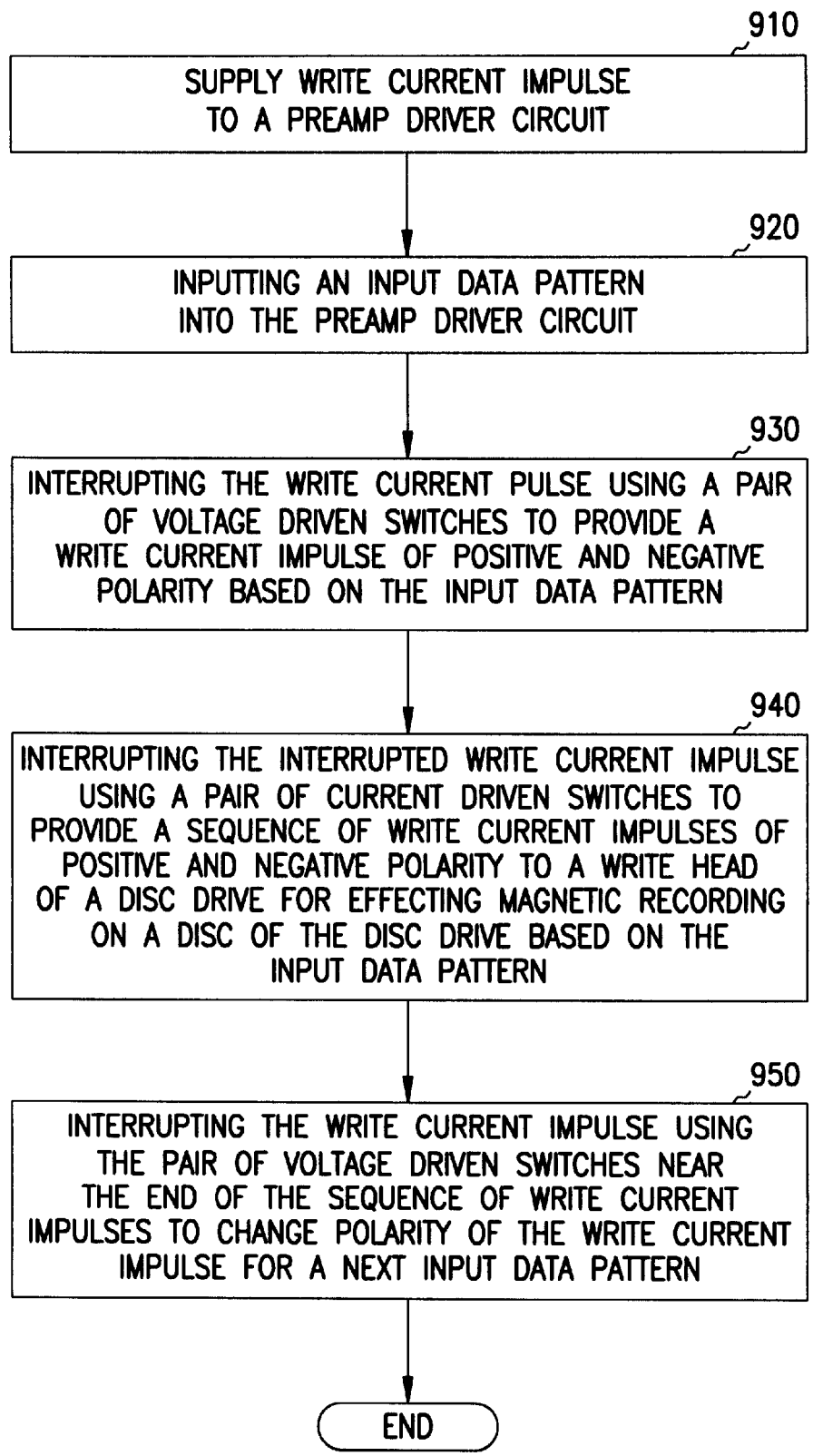
FIG. 9 is a flow diagram of the improved magnetic recording procedure of the present invention.

FIG. 9 is a flow diagram outlining a method of magnetic recording on a disc drive 100 according to the present invention. In one embodiment input data pattern 910 and 920 is received and interrupted by a pair of voltage driven switches of the preamp circuitry 610 to provide a write current impulse of positive and negative polarity based on the input data pattern 930, and further the write current impulses are interrupted by a pair of current driven switches of the preamp circuitry 610 to provide a sequence of write current impulses of positive and negative polarity to the write head 150 of the disc drive 100 for effecting a magnetic recording on the disc based on the input data pattern 940, further the write current impulses are interrupted by the voltage driven switches of the preamp circuitry 610 to change polarity of the write current impulses for a next input data pattern 950.

Advantageously, the improved preamp set forth above, allows the preamp to input lower power, and higher peak currents into the write head. Further the improved preamp eliminates the need for write current overshoot adjustments, and provides faster write current rise times, since the impulses eliminate the need for maintaining steady current to the write head. Further the write current impulses having a higher peak currents enables writing higher coercivity media faster than the current design. This improved preamp generating write current impulses results in less heat being generated at the write head, thereby avoiding the overheating problem existing in the current designs. Also this improved method of recording permits faster field raise times, and further simplifies the preamp current drive circuit design. The faster raise times improves a transition zone on the disc which can result in improved signal to noise ratio performance.

Figure 10:
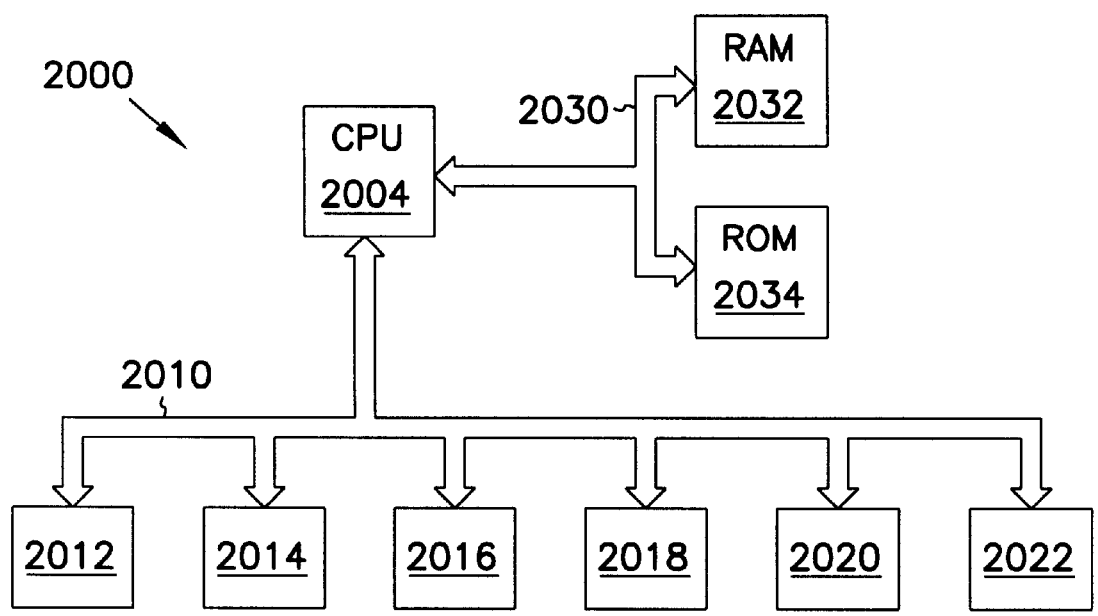
FIG. 10 is a schematic view of a computer system.

FIG. 10 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2000 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a disc drive 100 includes at least one disc 134 rotatably attached to a base 112. Also rotatably attached to the base 112 on an actuator shaft 118 is an actuator assembly 120. Actuator assembly 120 includes an arm 123, a base plate 125 attached to one end of the arm 123, a load beam 124 further attached to the same end of the arm 123, and a slider attached to one end of the load beam 124. Attached to one end of the actuator assembly 120 is a write head 150 having a predetermined head gap 240. The write head 150 is in transducing relationship with the disc 134. The write head 150 further includes a preamp current driver circuit 610 for providing a write current impulse to drive the write head 150, and a data pulse circuit 620 for supplying digital data signal based on an input data pattern. The preamp current driver circuit 610 is operatively coupled to the data pulse circuit 620. The preamp current driver circuit 610 further includes a pair of voltage driven switches 710 and 720 to provide a write current impulse of opposite polarity based on the input data pattern. The preamp current driver circuit 610 further includes a pair of current driven switches 730 and 740 to receive the write current impulse from the pair of voltage driven switches 710 and 720, and provide a sequence of write current impulses of opposite polarity to the write head 150 for effecting magnetic recording on the disc 134 of the disc drive 100 based on the input data pattern. The voltage driven switches 710 and 720 further change the polarity of the write current impulse anytime near an end of the sequence of write current impulses. In embodiment the voltage driven switches 710 and 720 change the polarity of the write current impulse during the last two consecutive write current impulses of the sequence of write current impulses. This technique does not involve driving the write head 150 continuously during an entire bit or cell time. This technique also enables the recording to be done with write current impulses which are generated at edges of the bit or cell time. This is generally possible because the field generated from the write head 150 is generally large enough to magnetize or stamp media beyond a write head gap 240.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of recording data on a disc drive, comprising steps of:
   (a) supplying write current impulse to a preamp current driver circuit of a write head of the disc drive;
   (b) inputting an input data pattern into the preamp current driver circuit;
   (c) interrupting the write current impulse using a plurality of voltage driven switches in the preamp current driver circuit to provide a write current impulse of positive and negative polarity based on the input data pattern;
   (d) interrupting the interrupted write current impulse using a plurality of current driven switches in the preamp current driver circuit to further provide a sequence of write current impulses of positive and negative polarity to a write head of the disc drive for effecting magnetic recording on the disc, based on the input data pattern; and
   (e) interrupting the write current impulse using the plurality of voltage driven switches anytime during a last two consecutive write current impulses of the sequence of write current impulses to change polarity of the write current impulse for a next input data pattern.

2. The method of claim 1, wherein the sequence of write current impulses of the interrupting step of (d) includes a leading edge write current transition impulse and a trailing edge write current transition impulse during the input data pattern.

3. The method of claim 2, wherein the interrupting step (d) further includes (d)(i) providing the leading edge write current transition impulse and the trailing edge write current transition impulse to be of opposite polarity during the input data pattern.

4. The method of claim 3, further comprising the step (d)(ii) of providing a sequence of write current impulses of a predetermined length of effective recording field on the disc based on a predetermined head gap of the write head to a velocity of the disc rotating past the write head.

5. The method of claim 4, wherein the providing step (d)(ii) includes having a predetermined repetition period in the sequence of write current impulses based on the predetermined head gap of the write head to a velocity of the disc rotating past the write head, wherein the sequence of write current impulses amplitude between the leading and the trailing edge write current transition impulses is sufficient to maintain a substantially equalized recorded continuum between the sequence of write current impulses, when a time for length of recording between the leading and trailing edge write current transition impulses are greater than the time for the predetermined length of effective recording.

6. The method of claim 5, wherein the leading and trailing edge write current transition impulses are occurring at the beginning and end of the input data pattern, respectively.

7. The method of claim 5, wherein the predetermined repetition period is approximately in the range of about two to three times the time required for the predetermined length of effective recording.

8. A disc drive, comprising:
   a base;
   a disc rotatably attached to the base;
   a write head having a predetermined head gap;
   an arm for carrying the write head in transducing relation with respect to the disc;
   a power source for providing write current impulses;
   a data pulse circuit for providing digital data based on an input data pattern; and
   a preamp current driver circuit, operatively coupled to the power source, and the data pulse circuit, further includes:
      a plurality of voltage driven switches, wherein the voltage driven switches interrupt the write current impulse to provide a write current impulse of positive and negative polarity based on the input data pattern;
      a plurality of current driven switches, coupled in series with the write head and the plurality of voltage driven switches, wherein the plurality of current driven switches further interrupt the interrupted write current impulse to provide a sequence of write current impulses to the write head for effecting magnetic recording on the disc of the disc drive based on the input data pattern, wherein the plurality of voltage driven switches interrupt the write current impulse anytime near an end of the sequence of write current impulses to change polarity of the write current impulse for a next input data pattern; and
   wherein the preamp current driver circuit generates a leading edge write current transition impulse occurring at the beginning of the input data pattern and a trailing edge write current transition impulse occurring at the input data pattern, wherein the leading and the trailing edge write current transition impulses are of opposite polarity.

9. The disc drive of claim 8, wherein the write head provides a predetermined length of effective recording field on the disc based on the predetermined head gap to a velocity of the disc rotating past the write head.

10. The disc drive of claim 8, wherein the plurality of voltage and current driven switches are a pair of voltage and current driven transistors, respectively.

11. The disc drive of claim 10, wherein the pair of voltage driven transistors includes an NPN transistor and a PNP transistor.

12. The disc drive of claim 11, wherein the pair of current driven transistors includes an NPN transistor and a PNP transistor.

13. The disc drive of claim 8, wherein the preamp current driver circuit directs the write current impulse of positive and negative polarity to one of a plurality of write heads in the disc drive.

14. The disc drive of claim 8, wherein the plurality of voltage driven switches interrupt the write current impulses anytime during a last two consecutive write current impulses of the sequence of write current impulses to change polarity of the write current for a next input data pattern.

* * * * *